United States Patent
Su

(10) Patent No.: US 8,081,283 B2
(45) Date of Patent: Dec. 20, 2011

(54) LIQUID CRYSTAL DISPLAY PANEL WITH PIXEL ELECTRODES HAVING BRIDGE ELECTRODE

(75) Inventor: Mu-Jen Su, Hsin-Chu (TW)

(73) Assignee: AU Optronics Corp., Science-Based Industrial Park, Hsin-Chu (TW)

( * ) Notice: Subject to any disclaimer, the term of this patent is extended or adjusted under 35 U.S.C. 154(b) by 0 days.

(21) Appl. No.: 12/829,395

(22) Filed: Jul. 2, 2010

(65) Prior Publication Data

US 2010/0265446 A1    Oct. 21, 2010

Related U.S. Application Data

(62) Division of application No. 11/682,262, filed on Mar. 5, 2007, now abandoned.

(30) Foreign Application Priority Data

Oct. 16, 2006 (TW) .............................. 95138051 A

(51) Int. Cl.
*G02F 1/1343* (2006.01)
(52) U.S. Cl. ........ 349/144; 349/141; 349/142; 349/143; 349/145; 349/146; 349/38; 349/39
(58) Field of Classification Search .......... 349/141–146, 349/38–40
See application file for complete search history.

(56) References Cited

U.S. PATENT DOCUMENTS

| | | | | |
|---|---|---|---|---|
| 5,585,948 A | * | 12/1996 | Petera | 349/143 |
| 6,407,791 B1 | * | 6/2002 | Suzuki et al. | 349/129 |
| 6,842,213 B2 | | 1/2005 | Kim | |
| 7,245,343 B2 | | 7/2007 | Suzuki | |
| 7,250,996 B2 | | 7/2007 | Yoshida | |
| 7,450,205 B2 | | 11/2008 | Yoshida | |
| 2003/0137628 A1 | | 7/2003 | Nagaoka | |
| 2005/0122452 A1 | * | 6/2005 | Yoshida et al. | 349/114 |
| 2006/0092341 A1 | | 5/2006 | Huang | |
| 2006/0139541 A1 | * | 6/2006 | Yamaguchi et al. | 349/130 |
| 2006/0158574 A1 | | 7/2006 | Kubo | |

FOREIGN PATENT DOCUMENTS

| | | |
|---|---|---|
| CN | 1664678 A | 9/2005 |
| JP | 200549899 | 2/2005 |
| TW | 571165 | 1/2004 |
| TW | 200513717 | 4/2005 |

* cited by examiner

*Primary Examiner* — Hoan C Nguyen
(74) *Attorney, Agent, or Firm* — Winston Hsu; Scott Margo

(57) ABSTRACT

A liquid crystal display panel includes a first substrate, a second substrate, a pixel disposed on the second substrate, a bottom capacitor electrode, a top capacitor electrode, a liquid crystal layer disposed between the first substrate and the second substrate, and a plurality of protrusions disposed on the first substrate. The pixel includes a first pixel electrode and a second pixel electrode, in which a main slit is formed between the first pixel electrode and the second pixel electrode. The bottom capacitor electrode is disposed on the second substrate and overlaps a portion of the main slit, and the top capacitor electrode is disposed on the second substrate and forms a capacitor with the bottom capacitor electrode.

15 Claims, 6 Drawing Sheets

LIQUID CRYSTAL DISPLAY PANEL WITH PIXEL ELECTRODES HAVING BRIDGE ELECTRODE

CROSS REFERENCE TO RELATED APPLICATIONS

This is a divisional application of U.S. patent application Ser. No. 11/682,262 filed on Mar. 5, 2007, and the contents of which are included herein by reference.

BACKGROUND OF THE INVENTION

1. Field of the Invention

The invention relates to a liquid crystal display panel, and more particularly, to a multi-domain vertical alignment liquid crystal display panel.

2. Description of the Prior Art

Liquid crystal displays are commonly utilized in various electronic products including cell phones, PDAs, and notebook computers. As the market demand for large-scale display panels continues to increase, liquid crystal displays having advantages such as small size and light weight have become widely popular. In fact, liquid crystal displays are gradually replacing the conventional cathode ray tube (CRT) displays that had dominated the market for so many years. However, the viewing angle of the conventional liquid crystal displays is not sufficiently wide to ensure a high display quality, therefore, the development of liquid crystal displays is limited by this important factor. A multi-domain vertical alignment (MVA) or premium multi-domain vertical alignment (PMVA) display capable of orientating liquid crystals in various directions is therefore made to improve the problem of insufficient viewing angle resulted from the conventional displays.

Please refer to FIGS. 1-2. FIG. 1 is a plan view diagram illustrating a pixel of a multi-domain vertical alignment liquid crystal display 10 according to the prior art. FIG. 2 is a cross-section diagram of FIG. 1 along the sectional line AA'. As shown in FIG. 1 and FIG. 2, the conventional multi-domain vertical alignment liquid crystal display panel 10 includes a top substrate 12, a bottom substrate 14, a liquid crystal layer 16 having negative liquid crystals disposed between the top substrate 12 and the bottom substrate 14, and a first pixel electrode 20 and a second pixel electrode 28 disposed between the liquid crystal layer 16 and the bottom substrate 14.

A common electrode 18 disposed on the top substrate 12. A plurality of color filters (not shown) is disposed between the top substrate 12 and the common electrode 18. A plurality of protrusions 22 disposed with respect to the first pixel electrode 20 and the second pixel electrode 28. On the other hand, a capacitor 32 is disposed on the bottom substrate 14. The capacitor 32 is specifically disposed corresponding to the protrusions 22 of the top substrate 12.

Each of the first pixel electrode 20 and the second pixel electrode 28 can be a transmitting electrode composed of indium tin oxide or indium zinc oxide or a reflective electrode. The first pixel electrode 20 and the second pixel electrode 28 are separated by a main slit 26 and connected to each other by a rectangular bridge electrode 24, which can be a transmitting electrode.

The capacitor 32 is composed of a top capacitor electrode 38, a bottom capacitor electrode 34, and a dielectric layer 36 disposed between the top capacitor electrode 38 and the bottom capacitor electrode 34. Typically, the capacitor electrodes 36 and 38 are connected according to a parallel manner for forming a capacitor. The parallel connection of the capacitor increases the capacity of the capacitor and maintains the voltage of the capacitor.

Referring back to FIG. 1, the conventional capacitor is typically formed corresponding to the position of the protrusions. This design improves the problem of light leakage caused by unstable alignment of liquid crystals during dark state and increases the contrast of the display panel.

SUMMARY OF THE INVENTION

The present invention discloses a liquid crystal display panel. The liquid crystal display panel includes a first substrate, a second substrate, a pixel disposed on the second substrate, a bottom capacitor electrode, a top capacitor electrode, a liquid crystal layer disposed between the first substrate and the second substrate, and a plurality of protrusions disposed on the first substrate. The pixel includes a first pixel electrode and a second pixel electrode, in which a main slit is formed between the first pixel electrode and the second pixel electrode. The bottom capacitor electrode is disposed on the second substrate and overlaps a portion of the main slit, and the top capacitor electrode is disposed on the second substrate and forms a capacitor with the bottom capacitor electrode.

Specifically, the capacitor of the present invention is formed corresponding to the position of the main slit between the two pixel electrodes.

These and other objectives of the present invention will no doubt become obvious to those of ordinary skill in the art after reading the following detailed description of the preferred embodiment that is illustrated in the various figures and drawings.

DETAILED DESCRIPTION

The stability of the liquid crystal and the uniformity of the display region are typically determined by whether the liquid crystals are positioned according to a ±90° angle. In most cases, a maximum stability can be achieved if the ±90° angle of the liquid crystals is in the center of the pixel. Otherwise, the domain of the display region would result in an uneven state. Since the angle of the liquid crystals is governed by the magnitude of the electric field or the influence contributed by the protrusions and the main slits, the conventional design of having only one bridge electrode is often affected by the force pulling from either left or right side, thus affecting the uniform state of the liquid crystals. The result causes the ±90° angle of the liquid crystals to be present in regions other than the center of the bridge electrode, which ultimately causes the liquid crystals to shift toward left, right, or other unexpected directions.

It is an objective of the present invention to provide a multi-domain vertical alignment liquid crystal display panel for improving the problem of light leakage of the main slit region during dark state and preventing the liquid crystals from shifting toward left or right as a result of using the single bridge electrode design.

It is another aspect of the present invention to provide a multi-domain vertical alignment liquid crystal display panel for solving the problem of light leakage with respect to the main slit region as the capacitor is formed corresponding to the position of the protrusions.

The present invention specifically forms the capacitor in a position corresponding to the main slit between two pixel electrodes. Preferably, the capacitor can be used to reduce the light leakage of the main slit region for increasing the usability of high pixels and the overall aperture ratio of the display panel. Additionally, a bridge electrode having a shrinking pattern can be formed while the capacitor is disposed with respect to the main slit, such that the shrinking pattern of the bridge electrode can be used to improve uneven distribution of liquid crystals found in conventional rectangular bridge electrodes.

Figure 1:
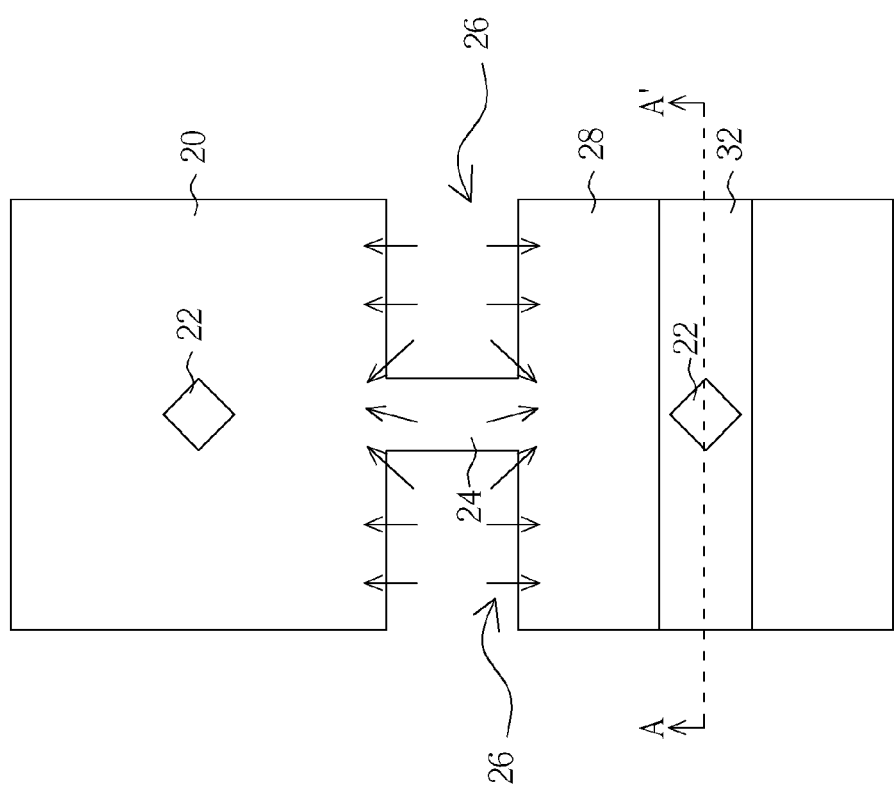
FIG. 1 is a plan view diagram illustrating a pixel of a multi-domain vertical alignment liquid crystal display according to the prior art.
Figure 2:
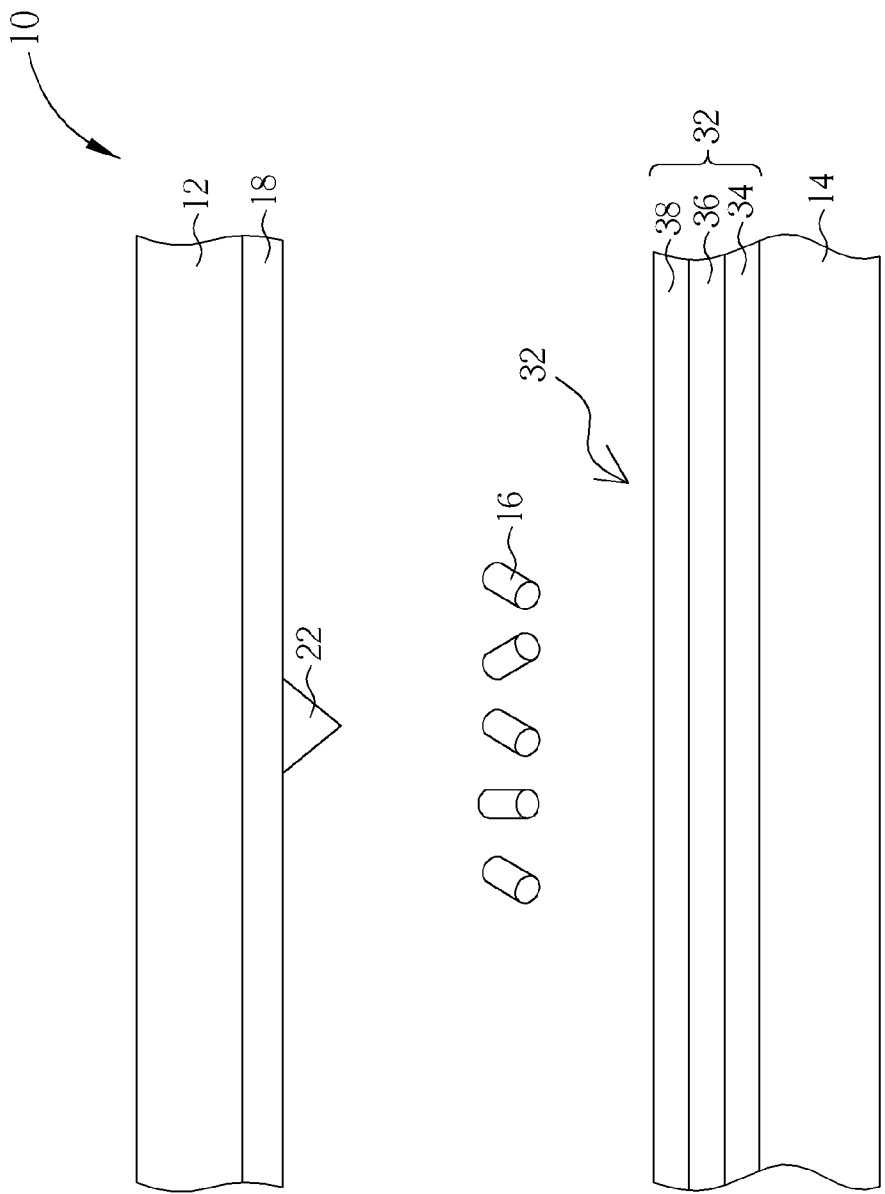
FIG. 2 is a cross-section diagram of FIG. 1 along the sectional line AA'.
Figure 3:
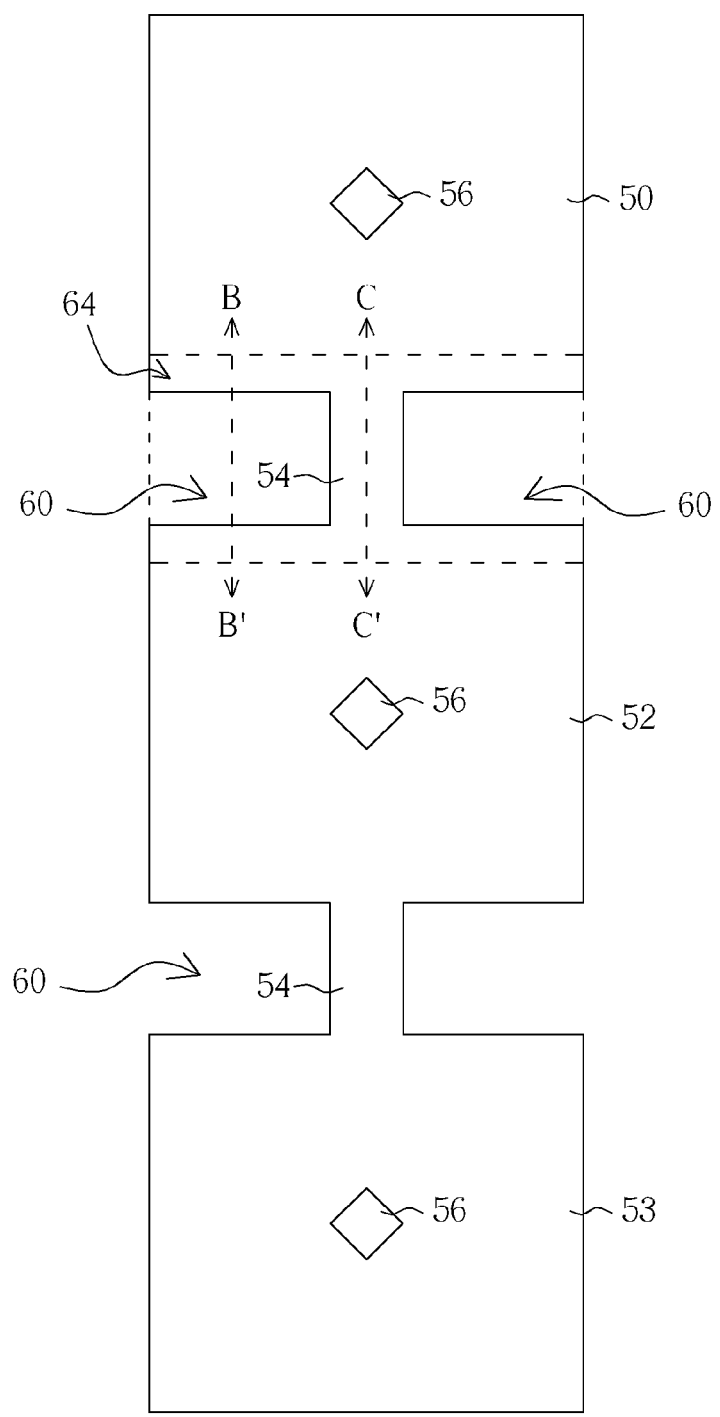
FIG. 3 is a plan view of a pixel of a multi-domain vertical alignment liquid crystal display panel according to a preferred embodiment of the present invention.
Figure 4:
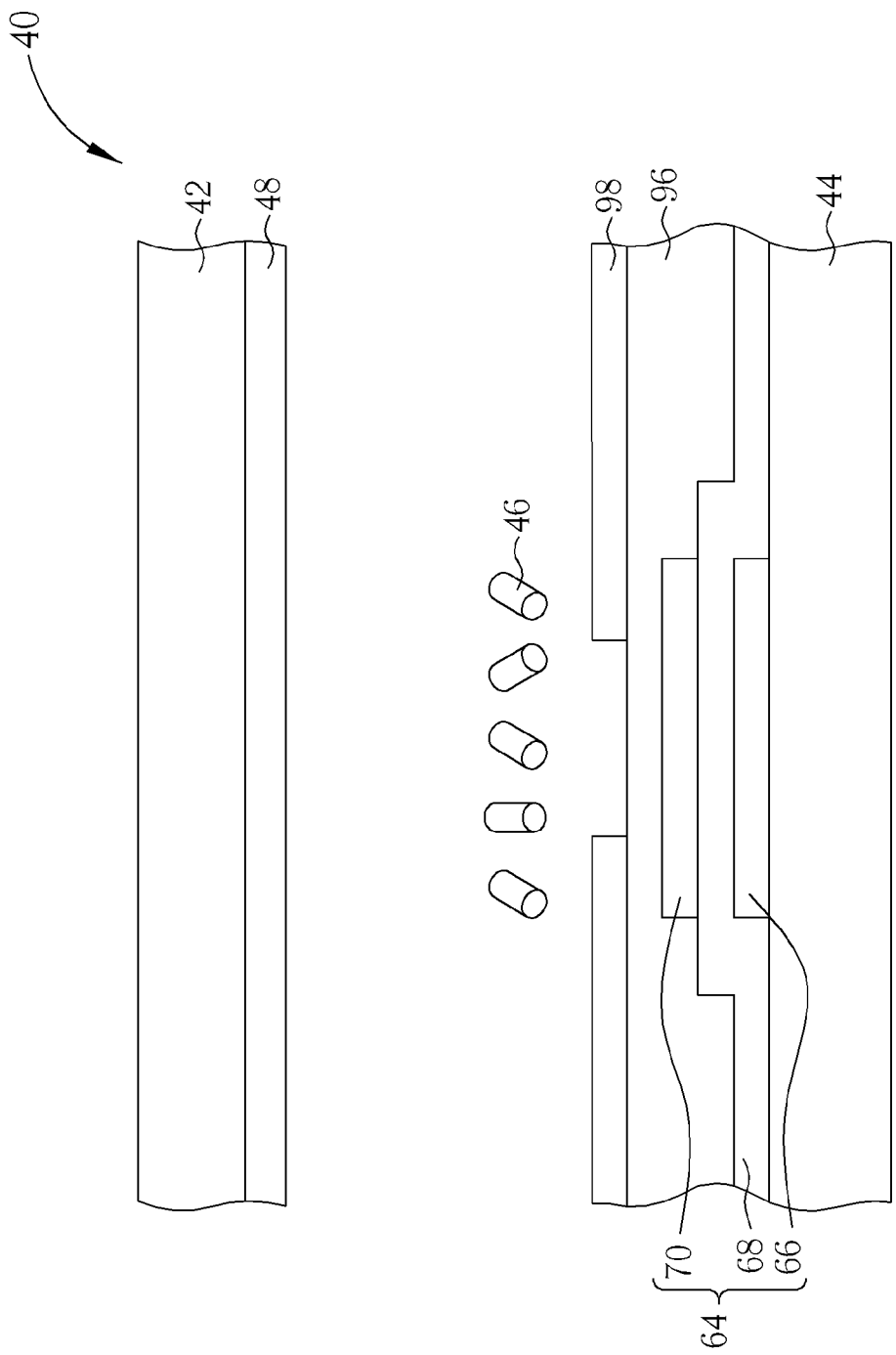
FIG. 4 is a cross-section diagram of FIG. 3 along the sectional line BB'.
Figure 5:
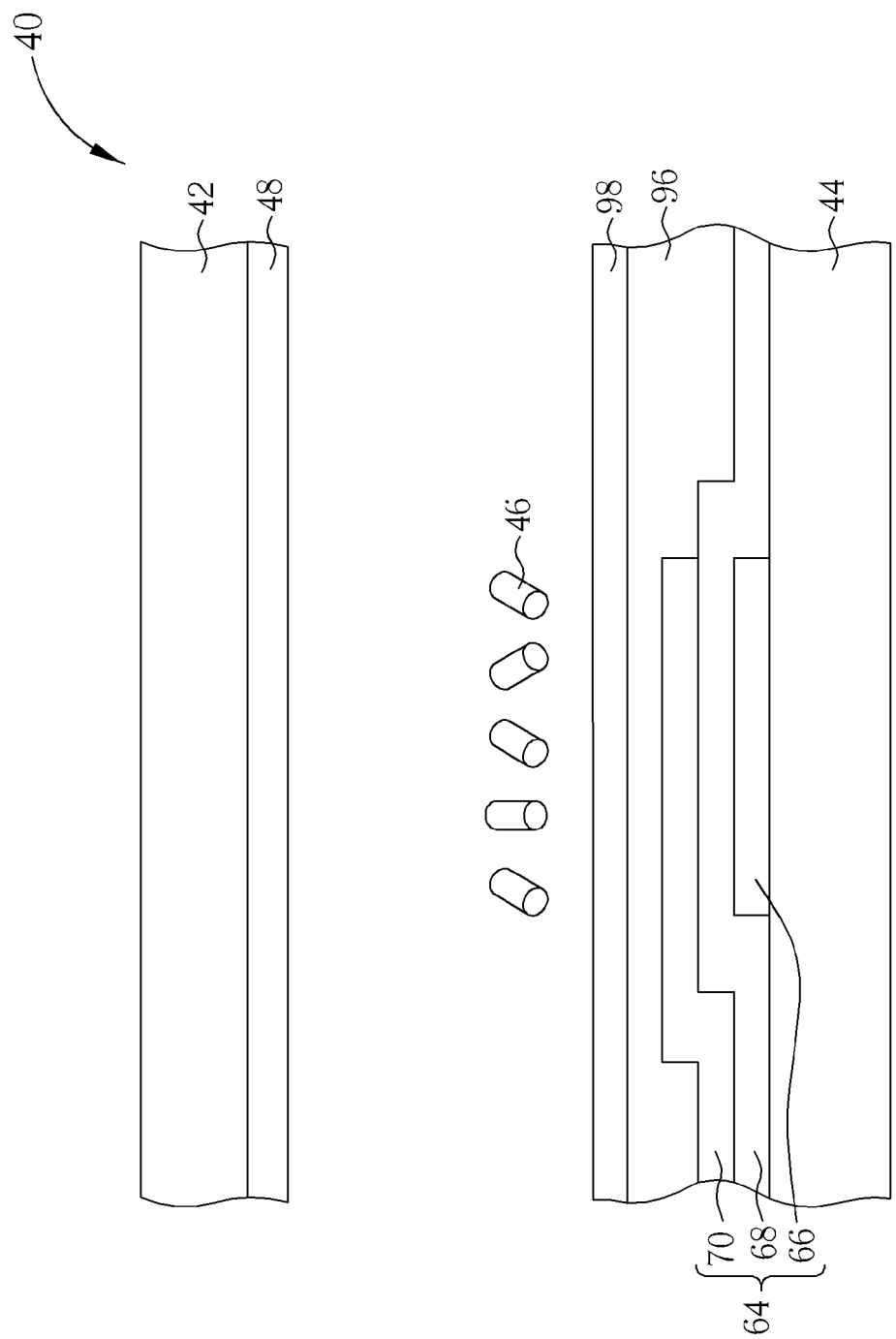
FIG. 5 is a cross-section diagram of FIG. 3 along the sectional line CC'.

Please refer to FIGS. 3-5. FIG. 3 is a plan view of a pixel of a multi-domain vertical alignment liquid crystal display panel 40 according to a preferred embodiment of the present invention. FIG. 4 is a cross-section diagram of FIG. 3 along the sectional line BB', and FIG. 5 is a cross-section diagram of FIG. 3 along the sectional line CC'. As shown in FIGS. 3-5, the multi-domain vertical alignment liquid crystal display panel 40 includes a top substrate 42, a bottom substrate 44, a liquid crystal layer 46 having negative liquid crystals disposed between the top substrate 42 and the bottom substrate 44, a first pixel electrode 50, a second pixel electrode 52, and a third pixel electrode 53 disposed between the liquid crystal layer 46 and the bottom substrate 44. A pixel is commonly defined by two data lines (not shown) and two scan lines (not shown).

Multi-domain vertical alignment liquid crystal display panel 40 includes a common electrode 48 formed on the surface of the top substrate 42, a plurality of color filters (not shown) disposed between the top substrate 42 and the common electrode 48, a plurality of protrusions 56 disposed with respect to the first pixel electrode 50, the second pixel electrode 52, the third pixel electrode 53, and two rectangular bridge electrodes 54 electrically connected to the first pixel electrode 50, the second pixel electrode 52, and the third pixel electrode 53. A capacitor 64 is formed on the surface of the bottom substrate 44. A planarizing layer 96 is disposed on the capacitor 64, and a transparent conductive layer 98 is formed on the planarizing layer 96. The bridge electrodes 54 can be formed in the same fabrication process or same layer as the first pixel electrode 50, the second pixel electrode 52, and the third pixel electrode 53. The shape, size, depth, and width of the bridge electrodes 54 can be adjusted according to the design of the product, which are all within the scope of the present invention.

The first pixel electrode 50, the second pixel electrode 52, and the third pixel electrode 53 are preferably transparent electrodes composed of indium tin oxide or indium zinc oxide, such as the transparent conductive layer 98, or reflective electrodes composed of reflecting metals. Additionally, a main slit 60 is formed between the first pixel electrode 50 and the second pixel electrode 52, and between the second pixel electrode 52 and the third pixel electrode 53 respectively, in which main slits 60 are formed among the bridge electrodes 54, the first pixel electrode 50 and the second pixel electrode 52, or among the bridge electrodes 54, the second pixel electrode 52 and the third pixel electrode 53.

It should be noted that the capacitor 64 of the present invention is formed on the bottom substrate 44 corresponding to the main slit 60. The capacitor 64 is preferably composed of a top capacitor electrode 70, a bottom capacitor electrode 66, and a dielectric layer 68 disposed between the two electrodes 70 and 66. The top capacitor electrode 70 is connected to the drain of the thin film transistors (not shown) disposed on the bottom substrate 44, in which the top capacitor electrode 70 and/or the bottom capacitor electrode 66 partially or at least overlaps the main slit 60. In other words, by forming the capacitor 64 in a position corresponding to the main slit 60, the present invention is able to improve the problem of light leakage with respect to the main slit region, thus increasing the transmittance and usability of the pixels.

Figure 6:
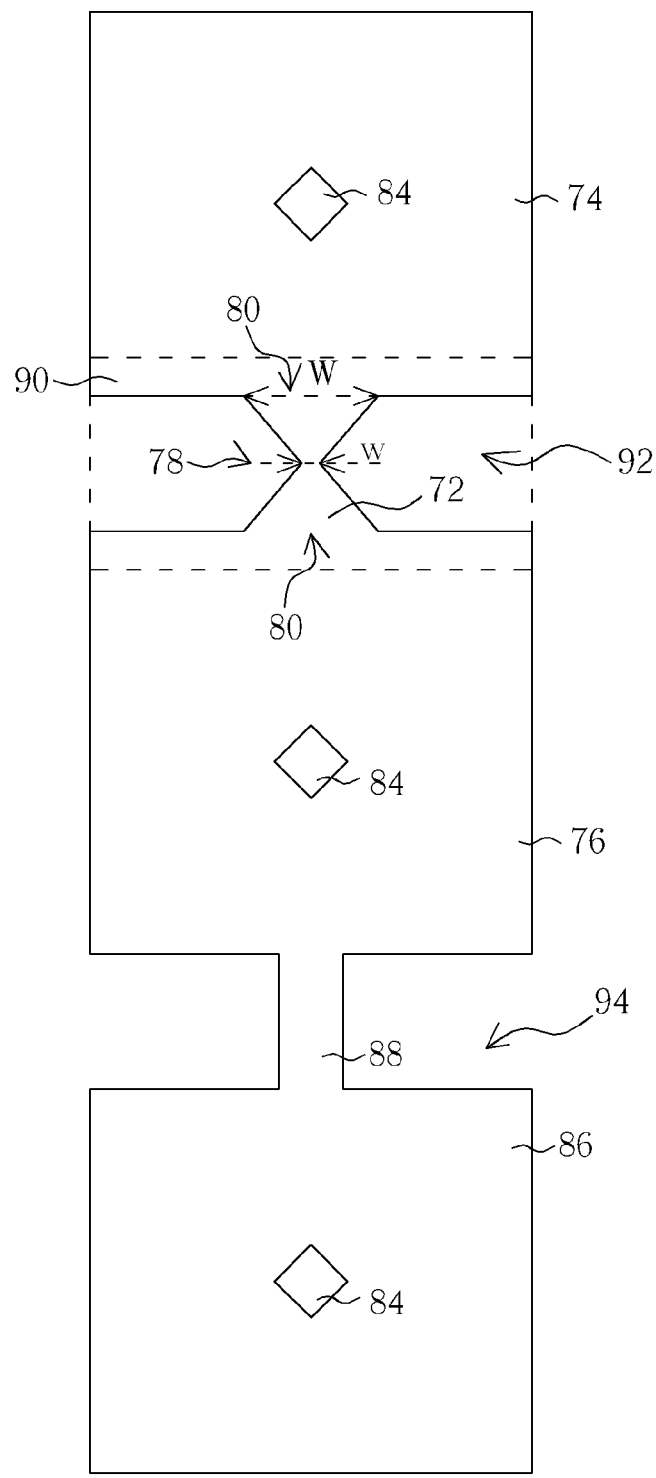
FIG. 6 illustrates a plan view of a pixel of a multi-domain vertical alignment liquid crystal display panel according to an embodiment of the present invention.

Please refer to FIG. 6. FIG. 6 illustrates a plan view of a pixel of a multi-domain vertical alignment liquid crystal display panel according to an embodiment of the present invention. As shown in FIG. 6, this embodiment includes a first pixel electrode 74, a second pixel electrode 76, a third pixel electrode 86, a bridge electrode 72 connecting the first pixel electrode 74 and the second pixel electrode 76, a bridge electrode 88 connecting the second pixel electrode 76 and the third pixel electrode 86, and a plurality of protrusions 84 disposed corresponding to the pixel electrodes.

The first pixel electrode 74, the second pixel electrode 76, and the third pixel electrode 86 are preferably transparent electrodes composed of indium tin oxide or indium zinc oxide or reflective electrodes composed of reflecting metals. A first main slit 92 is formed among the first pixel electrode 74, the second pixel electrode 76 and the bridge electrode 72, a second main slit 94 is formed among the second pixel electrode 76, the third pixel electrode 86 and the bridge electrode 88. Preferably, the first main slit 92 (or the bridge electrode 72) includes a slant (not shown) formed between the central portion 78 and two end portion 80. Additionally, a capacitor 90 is disposed corresponding to the position of the main slit 92.

In contrast to the rectangular bridge electrodes, the bridge electrode 72 formed between the first pixel electrode 74 and the second pixel electrode 76 includes a central portion 78 and two end portion 80, in which the width W of each of the end portion 80 is greater than the width w of the central portion 78. The bridge electrode 72 or 88 can also be formed in the same fabrication process or same layer as the first pixel electrode 74 and the second pixel electrode 76. The shape, size, depth, and width of the bridge electrodes 72 or 88 can also be adjusted according to the design of the product, which are all within the scope of the present invention.

Specifically, the present invention not only forms the capacitor 90 in a spot corresponding to the location of the main slit to increase the transmittance and utilization of the pixels, but also forms a bridge electrode 72 with a shrinking pattern to improve the problem of unstable arrangement of liquid crystals caused by conventional rectangular design of the bridge electrodes.

Overall, the present invention forms the capacitor in a position relative to the main slit that is formed between two pixel electrodes. By using this design, the capacitor can be used to reduce the problem of light leakage with respect to the main slit region during dark state and increase the transmittance and utilization of the pixels. Additionally, bridge electrodes with shrinking patterns can also be incorporated with the design of the capacitor, in which the shape of the shrinking pattern can be used to improve unstable alignment of the liquid crystals and increase the optical property of the display panel.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A liquid crystal display panel, comprising:
    a first substrate and a second substrate disposed opposite to the first substrate;
    a pixel, comprising a first pixel electrode, a second pixel electrode, a third pixel electrode, a first bridge electrode formed between the first pixel electrode and the second pixel electrode, and a second bridge electrode formed between the second pixel electrode the third pixel electrode, disposed on the second substrate, wherein a main slit is formed among the first pixel electrode, the second pixel electrode and the first bridge electrode, the first bridge electrode has a slant, and the second bridge electrode has no slant;
    a bottom capacitor electrode disposed on the second substrate and overlaps at least a portion of the main slit, wherein the bottom capacitor electrode does not overlap with the second bridge electrode; and
    a liquid crystal layer disposed between the first substrate and the second substrate.

2. The liquid crystal display panel of claim 1, further comprising a top capacitor electrode disposed on the second substrate and forms a capacitor with the bottom capacitor electrode.

3. The liquid crystal display panel of claim 2, wherein the top capacitor electrode partially overlaps the main slit.

4. The liquid crystal display panel of claim 1, further comprising a common electrode disposed on the first substrate.

5. The liquid crystal display panel of claim 4, further comprising a plurality of color filters disposed between the first substrate and the common electrode.

6. The liquid crystal display panel of claim 1, wherein each of the first pixel electrode and the second pixel electrode comprises a transmitting electrode or a reflective electrode.

7. The liquid crystal display panel of claim 1, wherein the first pixel electrode and the second pixel electrode are comprised of indium tin oxide or indium zinc oxide.

8. The liquid crystal display panel of claim 1, further comprising a plurality of thin film transistors disposed on the second substrate.

9. The liquid crystal display panel of claim 1, further comprising a plurality of protrusions disposed on the first substrate.

10. The liquid crystal display panel of claim 9, wherein the bridge electrode comprises a central portion and two end portion, wherein the width of each of the end portion is greater than the width of the central portion.

11. The liquid crystal display panel of claim 1, wherein the liquid crystal layer comprises a plurality of negative liquid crystals.

12. The liquid crystal display panel of claim 1, wherein the third pixel electrode comprises a transmitting electrode or a reflective electrode.

13. The liquid crystal display panel of claim 1, wherein the bridge electrode comprises a central portion and two end portion, wherein the width of each of the end portion is greater than the width of the central portion.

14. A liquid crystal display panel, comprising:
    a first substrate and a second substrate disposed opposite to the first substrate;
    a pixel, comprising a first pixel electrode, a second pixel electrode, a third pixel electrode, a first bridge electrode between the first pixel electrode and the second pixel electrode and a second bridge electrode between the second pixel electrode and the third pixel electrode, wherein a main slit is formed among the first pixel electrode, the second pixel electrode and the first bridge electrode, wherein the first bridge electrode comprises a central portion and two end portion, wherein the width of each of the end portion is greater than the width of the central portion, and the second bridge electrode has no slant;
    a bottom capacitor electrode disposed on the second substrate and overlaps a portion of the main slit, wherein the bottom capacitor electrode does not overlap with the second bridge electrode; and
    a liquid crystal layer disposed between the first substrate and the second substrate.

15. A liquid crystal display panel, comprising:
    a first substrate;
    a pixel, comprising a first pixel electrode, a second pixel electrode, a third pixel electrode, a first bridge electrode between the first pixel electrode and the second pixel electrode, and a second bridge electrode between the second pixel electrode and the third pixel electrode, wherein a main slit is formed among the first pixel electrode, the second pixel electrode and the bridge electrode, wherein the first bridge electrode comprises a central portion and two end portion, wherein the width of each of the end portion is greater than the width of the central portion and the second bridge electrode has no slant; and
    a bottom capacitor electrode disposed on the first substrate and overlaps a portion of the main slit, wherein the bottom capacitor electrode does not overlap with the second bridge electrode.

* * * * *